United States Patent [19]

Yokoyama

[11] Patent Number: 4,669,986
[45] Date of Patent: Jun. 2, 1987

[54] WRITING TRAINING DEVICE

[76] Inventor: Yoshimasa Yokoyama, 103, 5 - 3, Sumiyoshi-higasimachi 2-chome, Higashinada-ku, Kohbe-shi, Japan

[21] Appl. No.: 813,873

[22] Filed: Dec. 27, 1985

[51] Int. Cl.⁴ .............................................. G09B 11/04
[52] U.S. Cl. .................................................... 434/164
[58] Field of Search ......................................... 434/164

[56] References Cited

U.S. PATENT DOCUMENTS 1,887,163 11/1932 Lorber ................................ 434/164
3,774,319 11/1973 Sprowls .............................. 434/164

FOREIGN PATENT DOCUMENTS 498023 12/1937 United Kingdom ................ 434/164

*Primary Examiner*—William H. Grieb
*Attorney, Agent, or Firm*—Pahl, Lorusso & Loud

[57] ABSTRACT

A writing training device is disclosed, which comprises a base board with a surface having flexibility to such an extent as to be able to absorb the writing pressure to a certain extent and provided with letters, numerals, drawings, pictures or the like represented by grooves capable of receiving the tip of a pencil or like writing tool.

8 Claims, 4 Drawing Figures

WRITING TRAINING DEVICE

BACKGROUND OF THE INVENTION

1. Field of the Invention

This invention relates to a writing training device for training the writing of letters, numerals, drawings or pictures by repeatedly tracing guides with a writing tool or an imitation writing tool and, more particularly, to a writing training device which permits infants or physically handicapped children to master the proper way of writing letters, numerals, drawings, pictures or the like.

2. Description of the Prior Art

One prior art writing training device of the type in which the proper manner of writing is mastered by tracing a guide with a writing tool is like a notebook with each page printed with accurate letters or drawings consisting of dashed lines or thin solid lines. With this device, the training is done by tracing letters or drawings printed on each page with a writing tool such as a pencil with an underlay laid under the page. While this device can be manufactured inexpensively, it has the following drawbacks.

A first drawback is that a page that has been used once by tracing the printed letters or drawings can not be used once again. That is, a number of copies must be used until the proper manner of writing is mastered. Secondly, since the proper manner of writing is mastered by merely tracing the printed lines, a clumsy infant can not write with a paying writing pressure suited to him or her without, great attention lest the tip of the writing tool should deviate from the lines. Therefore, he or she cannot learn the writing pressure and writing speed which are proper for writing the same letters or the like on a paper sheet. Thirdly, since the infant can not sufficiently learn the writing pressure and writing speed, he or she cannot enjoy a sense of fulfillment in writing. Therefore, the student will soon be bored, so that sufficient training effects cannot be obtained.

SUMMARY OF THE INVENTION

An object of the present invention is to provide a writing training device, which can be used repeatedly for training.

Another object of the present invention is to provide a writing training device, which permits infants or physically handicapped children to master the proper manner for writing letters, numerals, drawings or the like efficiently and accurately without falling into a bad habit.

A further object of the present invention is to provide a writing training device, which permits infants or the like to trace letters, numerals, drawings or the like provided on a base board with a writing tool or an imitation writing tool without substantial possibility of deviation of the tip of the writing tool from lines being traced even without paying substantial attention to the writing tool tip.

A still further object of the present invention is to provide a writing training device, which permits infants or the like to trace letters or the like with natural writing pressure suited to themselves.

A yet further object of the present invention is to provide a writing training device, which permits infants or the like to trace letters or the like with a feel of natural writing pressure and writing speed and hence let them feel a sense of fulfillment in learning the proper manner of writing without becoming bored.

To attain the above objects of the present invention, there is provided a writing training device, which comprises a base board with at least the surface having flexibility to such an extent as to be able to absorb writing pressure, the surface of the base board being provided with letters, numerals, drawings, pictures or the like formed by grooves capable of receiving the tip of a pencil or other writing tools.

The above-mentioned and other objects and features of the invention will become apparent from the following detailed description taken in conjunction with the drawings which illustrate embodiments of the invention.

DESCRIPTION OF THE PREFERRED EMBODIMENTS

Figure 1:
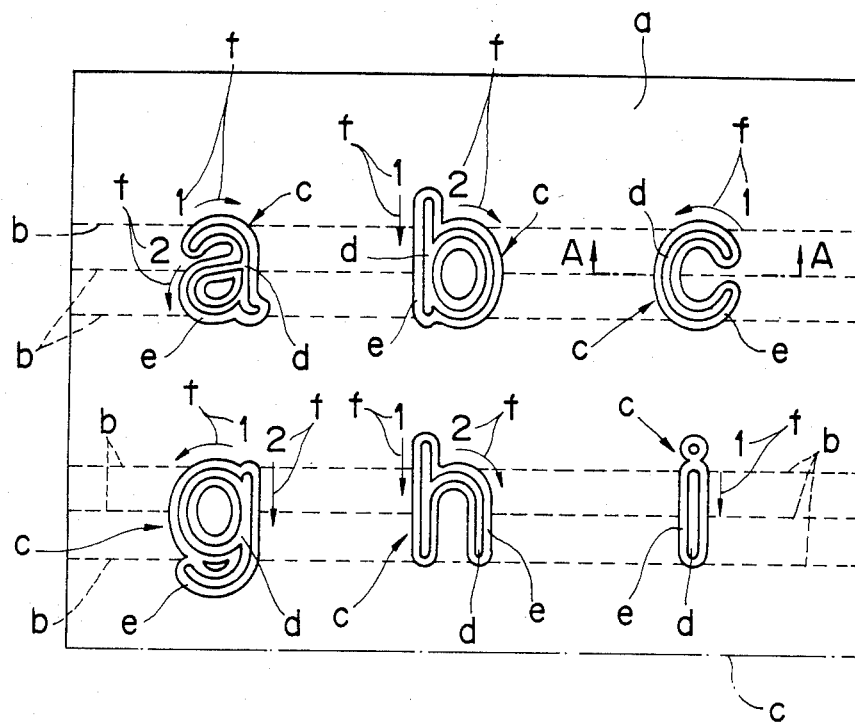
FIG. 1 is a plan view showing a portion of a writing training device according to the present invention.
Figure 2:
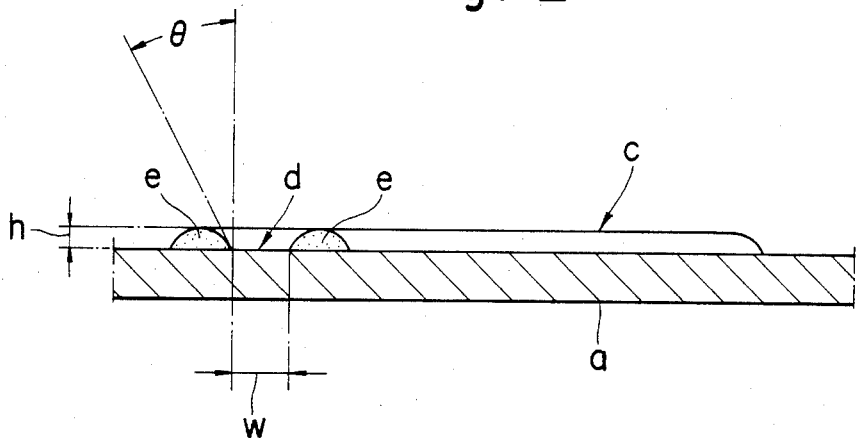
FIG. 2 is an enlarged-scale sectional view taken along line A—A in FIG. 1.

FIGS. 1 and 2 illustrate a first embodiment of the writing training device according to the present invention.

Reference symbol a designates a base board, which consists of a thick paper board, e.g., a cardboard. The surface of the base board is flexible to such an extent that it can absorb the writing pressure to a certain extent when letters or the like are written thereon with a pencil or like writing tool. The surface of the base board a is provided with a plurality of horizontal reference line groups b printed at a predetermined interval, each reference line group b consisting of three parallel dashed lines spaced apart a predetermined interval. Letters, i.e., alphabetic letters c, are provided at a predetermined interval in horizontal rows on the base board surface. These letters c, are formed with shallow grooves d upwardly flaring from the bottom and have a correct letter configuration, as shown in FIG. 2.

The side walls defining the grooves d shown in FIG. 2, suitably have an inclination angle of 20 to 40 degrees. A depth h of the groove d may be 0.3 to 1 mm, although it depends on the size of the letters or the degree training in writing. That is, the depth h is great when the size of the letters c is large or the degree of training is low, while it is small when the size of the letters c is small or the degree of training is high, within the range noted above. A width w of the groove d is around 1 mm. The bottom of the groove d is provided with a color other than the color provided on the rest of the base board a.

In this embodiment, the grooves d are formed by depositing foamable ink e by means of a screen printing on the base board on portions thereof corresponding to the opposite sides of grooves d and thermally foaming of the foamable ink e at a temperature of about 120° as shown in FIG. 2. After the grooves d representing the letters c have been formed in the above manner, the surface of the base board a is desirably coated with a synthetic resin (not shown) to protect the portions of foamed ink e.

It is convenient for tracing training to use a resin having a different color for the foamed ink e from that for the rest of the surface of the base board a. Further, when manufacturing training devices with different sizes of the letters c, foamable inks of different colors may be used for different sizes of the letters c. In this case, the different sizes of the letters c can be differentiated with corresponding colors of ink, for convenience.

Tracing order is provided as printed arrow marks f and order numbers near the letters c.

Figure 4:
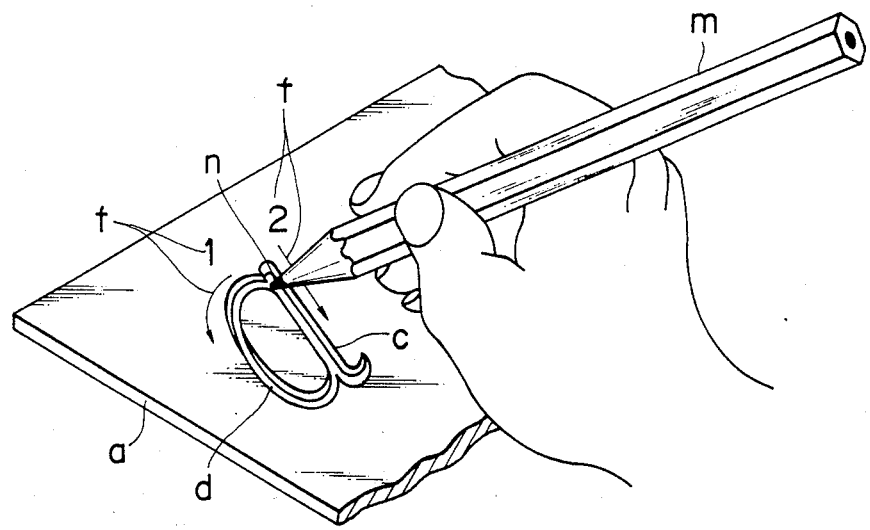
FIG. 4 is a schematic perspective view showing a training method using the writing training device according to the present invention.

To learn the letters c by tracing, the letters c are repeatedly traced with a pencil or like writing tool or an imitation writing tool m with a tip n thereof inserted in the grooves d constituting the letters c as shown in FIG. 4.

The imitation writing tool m is made of a synthetic resin such that it resembles a pencil. Its tip n is made slightly softer to facilitate tracing by the infants. Thus, it can be used substantially with the same feel as with a pencil.

The base board a is made of a material having sufficient flexibility to absorb the writing pressure to a certain extent as mentioned before. Therefore, the infants or the like may trace the letters c while leaning a natural writing pressure suited to themselves. Further, since the letters c are represented by the grooves d, the infants may learn to write with a feel of natural writing pressure and natural writing speed and with a sense of fulfilment in writing without the possibility of deviation of the writing tool tip from the lines constituting the letters c even without concentrating attention on the writing tool tip.

The base board a may be made of a synthetic resin, a synthetic rubber or the like in lieu of a cardboard. In this case, the synthetic resin or synthetic rubber used should be flexible to such an extent that the writing pressure can be absorbed to a certain extent so that the training produces a feel for proper writing pressure. Further, the base board a may consist of a lamination of two boards.

Where the base board a is formed from cardboard as mentioned earlier, the grooves d may be formed using press means.

Figure 3:
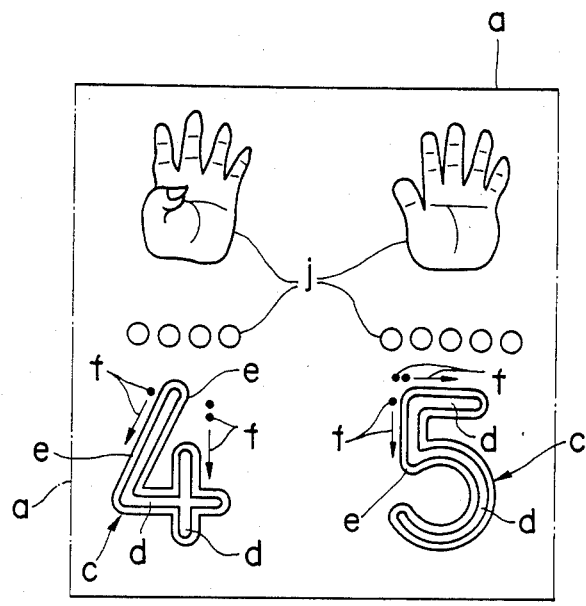
FIG. 3 is a plan view showing a portion of a different embodiment of the writing training device according to the present invention.

FIG. 3 shows a second embodiment of the writing training device according to the present invention. In this case, numerals c are provided as letters represented by the grooves d in a horizontal row on the surface of the base board a. The grooves d may be formed by the same means as in the preceding first embodiment. The numbers of numerals c are indicated by drawings j of hands or thick lines printed above the numerals c. The orders of tracing are indicated by numerals or points and arrow marks f printed near start portions of the numerals c. This writing training device can be used in the same way as the first embodiment.

FIG. 4 shows a third embodiment. In this case, the base board a of a synthetic resin having sufficient flexibility to absorb writing pressure to a certain extent is formed integrally with the grooves d representing the letters c using a mold (not shown). Indications f of the tracing order are provided near the letters c by points and arrow marks.

While the above embodiments are designed for learning letters c, it is also possible to provide plan drawings, e.g., circles, triangles and rectangles, or simple solid perspective drawings, on a base board in lieu of the letters c. Further, pictures may be provided in the same way.

What is claimed is:

1. A writing training device comprising a base board with a surface having flexibility to absorb the writing pressure and a foam material, defining raised letters, numerals, drawings, pictures or the like, adherred to said surface, said foam material having grooves for receiving and guiding the tip of a pencil or like writing tool in tracing said letters, numerals, drawings, pictures or the like.

2. The writing training device according to claim 1, wherein said foam material is formed by depositing a foamable ink by means of printing on portions of said base board corresponding to eventual opposite side walls of said grooves and thermally foaming said deposited foamable ink.

3. The writing training device according to claim 2, wherein said the opposite side walls of said grooves flare upwardly from the bottom with an inclination angle of 20 to 40 degrees.

4. The writing training device according to claim 2, wherein the portions of said base board constituting the bottom of said grooves are provided with a color different from the color of the rest of said base board.

5. The writing training device of claim 2 wherein said base board is a paper base board.

6. The writing training device according to claim 1 wherein said opposite side walls of said grooves flare upwardly from the bottom with an inclination angle of 20 to 40 degrees.

7. The writing training device according to claim 1 wherein the portions of said base board constituting the bottom of said grooves are provided with a color different from the color of the rest of said base board.

8. The writing training device of claim 1 wherein said base board is a paper base board.

* * * * *